United States Patent [19]

Botros et al.

[11] 4,078,155

[45] Mar. 7, 1978

[54] TELEPHONE APPARATUS FOR USE IN A CONFERENCE ROOM

[75] Inventors: Radamis Botros, Ottawa; Conrad Damien Lafrance, Lucerne, both of Canada

[73] Assignee: Northern Telecom Limited, Montreal, Canada

[21] Appl. No.: 760,078

[22] Filed: Jan. 17, 1977

[51] Int. Cl.² .............................................. H04M 1/20
[52] U.S. Cl. .............................. 179/1 CN; 179/1 HF;
179/1 MG; 179/1 DM
[58] Field of Search ............... 179/1 CN, 1 H, 1 MG,
179/1 E, 1 MF, 1 DM, 1 A, 1 HF

[56] References Cited

U.S. PATENT DOCUMENTS

| 2,230,104 | 1/1941 | Bostwick | 179/1 DM |
|---|---|---|---|
| 2,506,715 | 5/1950 | Ffolliot | 179/1 HF |
| 2,568,823 | 9/1951 | Potter | 179/1 HF |
| 3,069,508 | 12/1962 | Boeryd et al. | 179/1 HF |

*Primary Examiner*—Kathleen H. Claffy
*Assistant Examiner*—E. S. Kemeny
*Attorney, Agent, or Firm*—Sidney T. Jelly

[57] ABSTRACT

A telephone apparatus for use in a conference room has a housing, with a vertical central axis, with a loudspeaker at the upper end, coaxial with the vertical axis, and a microphone at the lower end. The loudspeaker faces upward with an unrestricted outlet and is omnidirectional in output. The microphone faces downward and is coaxial with the vertical axis, being sensitive only to airborne vibration only. The microphone is surrounded by an inclined surface extending outwardly and upwardly at an angle of about 30°, and has an omnidirectional sensitivity. The housing is supported with the microphone inlet about ½ inch above a surface, which can be the surface of a base member attached to the housing. The minimal peripheral distance from the center line of the speaker to the center line of the microphone, around the housing, is about 15 inches, for good acoustic separation. A resonator can be attached to the microphone inlet.

7 Claims, 5 Drawing Figures

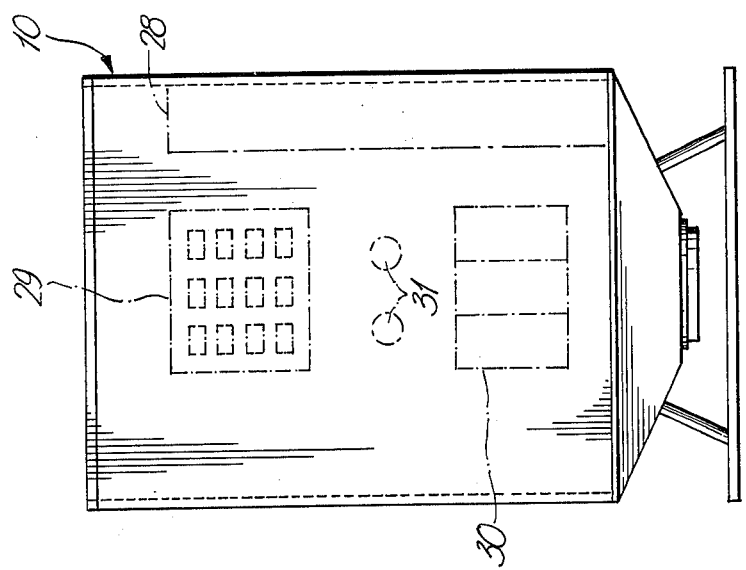
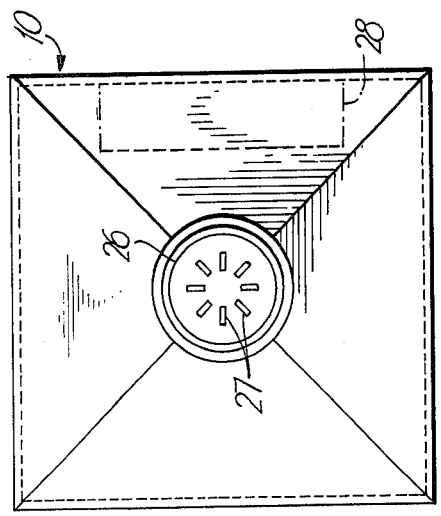
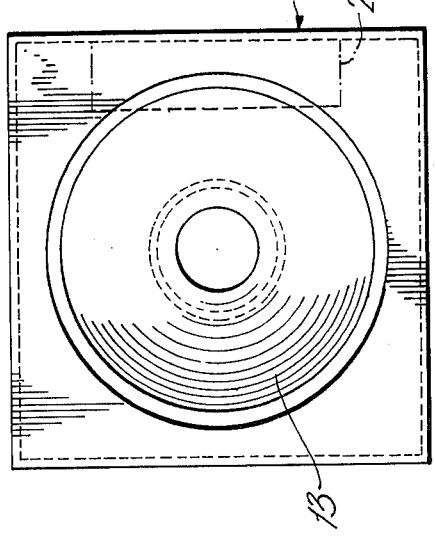
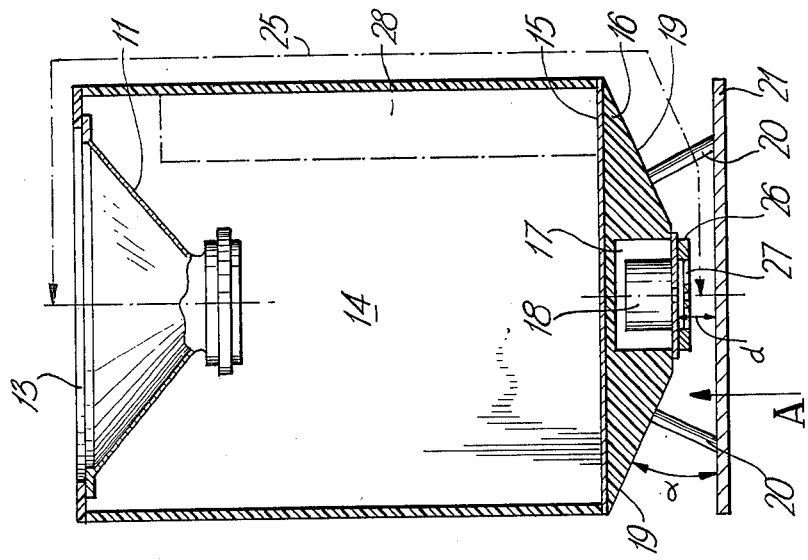

TELEPHONE APPARATUS FOR USE IN A CONFERENCE ROOM

This invention relates to a telephone conferencing apparatus and particularly to a unitary loudspeaker/microphone unit which gives adequate sound power output of good quality, is omnidirectional in both transmit and receive modes, and is aesthetically and practically acceptable in telephone conferences or public address uses.

Conventional telephone conferencing devices have certain disadvantages, depending upon the form of the device. Many have the speaker more obvious than the microphone which creates a human behaviour problem in that users speak to the speaker (which represents the remote party) instead of to the microphone. This can reduce the level and quality of the speech signal. In some devices the microphone is not omnidirectional and differing signal levels and quality arise as different participants in a room talk. The speaker and/or microphone may be very obvious and create some reaction by talkers.

The present invention provides an apparatus which is omnidirectional but still has adequate acoustic separation between speaker and microphone and is aesthetically pleasing, not being intrusive in a conference.

The speaker and microphone are on a common vertical axis, the speaker facing upward and the microphone downward. The microphone is at the centre of an inclined surface which avoids standing wave and other distortions. The speaker and microphone are omnidirectional, while at the same time good acoustic separation is provided. An existing electronic circuit, as used in an existing speakerphone, can be used, mounted in the housing of the apparatus, for connection to a telephone system, and a telephone dial, and other controls, can also be mounted in or on the housing. It is possible to have several of the speaker/microphone units interconnected. With voice switching — which is part of the normal electronic circuit — the unit being addressed will act as the microphone while the other units will be in a loudspeaker condition.

The invention will be readily understood by the following description of certain embodiments by way of example, in conjunction with the accompanying drawings, in which:

FIG. 1 is a vertical cross-section through one form of apparatus;

FIG. 2 is a view in the direction of arrow A in FIG. 1, with the base plate removed;

FIG. 3 is a plan view on the loudspeaker end;

FIG. 4 is a side view, illustrating positioning of contacts and a telephone dial;

Figure 5:
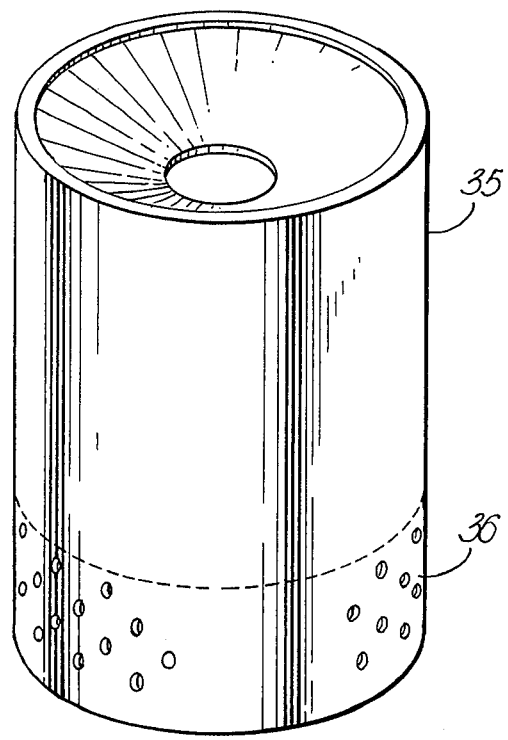
FIG. 5 is a perspective view of an alternative form of housing.

The apparatus as illustrated in FIGS. 1 to 4 has a housing 10 forming an enclosure elongated in the vertical direction, as seen in FIGS. 1 and 4, and having a square cross-section normal to the vertical axes, as seen in FIGS. 2 and 3. The dimensions of the square cross-sections, in the example illustrated, is sufficient to house the speaker 11. The top surface 12 of the housing 10 has an aperture 13 over the speaker 11. The speaker works in an enclosed chamber 14, the chamber being closed at the base by a diaphragm 15.

Attached to the diaphragm 15 is a microphone housing 16. The microphone housing has an aperture 17 facing downwards and a microphone 18 is mounted in the aperture, facing downwards. The microphone housing has an inclined surface 19, extending outwardly and upwardly to the housing 10. The angle of the surface 19, relative to the horizontal, is important.

The apparatus can be placed on a horizontal surface, with the microphone spaced close to the surface. Thus legs 20 can be used to support the apparatus with the desired clearance between microphone and supporting surface. However, the type of the supporting surface can affect the microphone. For example, if placed on a hard surface, such as a wood surface as in a table, the microphone will be effective. However if placed on a carpeted floor, or on a cloth surface of a table, the sensitivity of the microphone will be reduced especially at high frequencies. To make the apparatus independent of supporting surface, a hard base member 21 can be provided, attached by the legs 20, for example. The provision of the base 21 makes the unit suitable for any kind of mounting, for example on the floor, on a table, on a wall, or on the ceiling. The sensitivity will not be affected, nor will the omnidirectional feature.

The size of speaker can be varied, but it has been found that a 6 inches speaker gives adequate sound power output and acceptable quality. With a smaller speaker, base tones are lost and output sound power is less.

There are various parameters which should be taken into account when the apparatus is designed. There must be sufficient acoustic separation between the speaker 11 and the microphone 18. It has been found that this can be obtained by making the minimal peripheral distance between the speaker centre line and the microphone about 15 inches — that is the distance as indicated by the chain dotted line and arrows 25 in FIG. 1. This distance can be reduced slightly, but the desired level of acoustic separation starts to be reduced, if the distance is much less than about 15 inches. The distance between the front surface, or input, of the microphone and the support surface — the distance "$a$" in FIG. 1 — should be of the order of ½ inch, and the angle of the inclined surface 19 relative to the support surface — $\alpha$ in FIG. 1 — should be of the order of 30°.

The physical separation — the distance from the speaker centre line to the microphone centre line around the casing, is of course a function of the width of the housing and the height. It is possible to make the housing tall and thin or short and fat. There is no objection to increasing this distance but it is a matter of aesthetic appeal and also of being unobtrusive that provides some determination. For example, if stood on a table in a conference, with participants sitting around the table, it is desirable that the housing does not interfere with eye contact between participants. Also if made too thin then some local enlargement for the speaker will be necessary.

The mounting of the speaker and microphone on a common vertical axis is advantageous in that acoustic separation is symmetrical about the housing. Also, a very important feature, with the speaker facing upwards it is omnidirectional, and similarly with the microphone facing downwards it is also omnidirectional. This avoids the need for multiple speakers and/or multiple microphones, or alternatively the occurrence of directional sensitivity variations which can occur with other forms of conference apparatus.

With a downward facing microphone, facing a hard surface and the microphone mounted in a flat surface, strong resonances occur at the entrance to the microphone, due to standing waves. By inclining the surface surrounding the microphone, the formation of such resonances is avoided. This means that the apparatus itself does not add to the resonances of the room in which the apparatus is used and a substantially uniform frequency — response of the microphone results. The inclination of the surface can vary, an optimum of about 30° having been obtained. However this can be varied ± 5° quite readily. The inclined surface 19 is preferably flat but can be slightly curved, with the introduction of some undesirable frequency irregularities.

As stated, the vertical distance between the microphone entrance and the surface opposite the microphone, be it the base 21, when provided, or a table top or the like if base 21 is not provided, is important. A distance of about 0.5 inch ± 10% gives acceptable results, the efficiency of the microphone decreasing rapidly as the distance varies from the above. Outside these limits the microphone frequency response will not be uniform to an extent which is not acceptable.

The physical separation distance is preferably of the order of 15 inches. Reduction of this dimension will increase acoustic feedback from speaker and the microphone. This distance is important because low frequencies, for example below 1000 Hz, can diffract easily around obstacles. With increase in frequency, the increase in speaker directionality, as well as the effect of the "shadow" of the housing in the microphone area, make up for the increase of microphone sensitivity with frequency as is the case with telephone transmitters. Therefore a substantially constant value of acoustic separation is obtained and the acoustic stability of the unit becomes independent of frequency. The distance can be increased, but the above mentioned aesthetic and unobtrusive features then become a source of concern.

While in FIGS. 2 and 3, an open aperture is shown over the speaker this will normally be closed by a grill or screen to avoid damage to the speaker.

The use of a microphone which is sensitive to airborne sound and insensitive to mechanical vibration enables the speaker and microphone to be in a common housing. Such a microphone is an electret microphone as the electret microphone is insensitive to mechanical vibration. This provides a simple and economic solution to the problem of solid-borne acoustic feedback through the housing.

The configuration, substantially as illustrated, and with the preferred physical characteristics given above, provides an acoustic separation in excess of 20 decibels. This provides stable acoustic operation of the apparatus with a switch loss (a usual technique to avoid howling, in speaker-phones) of no more than 50 decibels. This makes the effect of voice-switching almost unnoticable.

In long subscriber loops there is excessive attenuation toward the high end of the telephone frequency range-above 1000 Hz. A resonator 26 attached at the microphone inlet boosts this high end of the frequency range, giving a crisper sound, a higher intelligibility of speech signals and an improved chance for talker recognition. The resonator 26 is a flat disc with a peripheral rim, and having apertures 27 in the disc portion. The apertures can be slots, holes or other formations.

The apparatus can be used in various ways. Thus it can be wired into an existing speakerphone set, using the circuitry of the set. It can be used as a combined conferencing and public address system in that each unit can have its own circuitry contained within the housing and the various units interconnected. The unit nearest to whoever is talking at a particular time will be voice-switched to a microphone regime, while the remaining units will be in a speaker regime, ensuring everyone can hear what is said.

Controls can be provided and, for example volume and/or tone controls can be provided. The unit can be directly wired into the telephone system, without an intervening speaker phone unit. In such a case the speakerphone circuitry is mounted within the housing, as indicated in chain-dotted outline at 28, in FIGS. 1 to 4. The dial 29 can be mounted in one side, together with various control buttons 30 and control knobs 31.

While the apparatus has been illustrated, and described as being of square cross-section, when viewed on the top or bottom, other cross-sections can be provided. Thus cylindrical housings, and multisided housings such as hexagons and octagons can be used. FIG. 5 is a perspective view of a unit having a cylindrical housing 35. In the particular example illustrated, the outer casing extends right the way down to encompass the microphone housing. The microphone is surrounded by an inclined surface in the same manner as in the previously described example, the inclined surface being conical. A perforated section 36 of the housing 35 surrounds the microphone section.

What is claimed is:

1. A telephone apparatus for use in a conference room, comprising:
    a housing having a vertical central axis;
    a speaker mounted at a top end of said housing, the axis of the speaker coaxial with said vertical axis, said speaker facing upwards and having an unrestricted outlet to provide an omnidirectional output;
    a microphone housing in the bottom end of said housing, said microphone housing having an aperture in a bottom surface facing downwards and coaxial with said vertical axis, a circular microphone in said aperture in the microphone housing, the microphone coaxial with said vertical axis, being sensitive to airborne vibration only and insensitive to mechanical vibration, and an inclined surface extending outwardly and upwardly from the periphery of said aperture to the housing, the inclined surface at an angle of about 30° ± 5° relative to a plane normal to said vertical axis, to provide an omnidirectional sensitivity of the microphone; and
    means for supporting said housing with a front surface of the microphone a distance of about ½ inch ± 0.05 inch from a surface normal to said vertical axis;
    the minimal peripheral distance from the centre line of said speaker to the centre line of said microphone, around the outside of said housing, being of the order of 15 inches.

2. Apparatus as claimed in claim 1, including a base member attached to said housing, a surface of said base member forming said surface opposed to said microphone.

3. Apparatus as claimed in claim 2, said housing including an outer casing, said outer casing extending to said base member, and apertures in said casing in the portion surrounding said microphone.

4. Apparatus as claimed in claim 1, including a resonator attached to the inlet of said microphone, to boost the high end of the frequency range of said microphone.

5. Apparatus as claimed in claim 1, including mounting means attached to said housing and electrical control members mounted on said mounting means.

6. Apparatus as claimed in claim 1, including mounting means attached to said housing and electrical circuit means mounted on said mounting means.

7. Apparatus as claimed in claim 6, said electrical circuit means comprising telephone circuit means, and a telephone dial mounted on said housing.

* * * * *